United States Patent
Yang et al.

(10) Patent No.: US 7,603,475 B2
(45) Date of Patent: Oct. 13, 2009

(54) METHOD FOR FLOW CONTROL IN A COMMUNICATION SYSTEM

(75) Inventors: Tomas Yang, Morristown, NJ (US); Qinqing Zhang, Morganville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 850 days.

(21) Appl. No.: 10/401,671

(22) Filed: Mar. 31, 2003

(65) Prior Publication Data

US 2004/0193719 A1   Sep. 30, 2004

(51) Int. Cl.
*G06F 15/16* (2006.01)
(52) U.S. Cl. ........................ 709/235; 709/233
(58) Field of Classification Search ................ 709/234, 709/233, 235
See application file for complete search history.

(56) References Cited

U.S. PATENT DOCUMENTS

| | | | | |
|---|---|---|---|---|
| 5,400,329 A * | 3/1995 | Tokura et al. | ............... | 370/232 |
| 6,456,590 B1 * | 9/2002 | Ren et al. | ................... | 370/229 |
| 6,657,954 B1 * | 12/2003 | Bird et al. | ................... | 370/229 |
| 7,007,095 B2 * | 2/2006 | Chen et al. | ................... | 709/230 |
| 7,072,299 B2 * | 7/2006 | Bass et al. | ................... | 370/235 |
| 7,092,387 B2 * | 8/2006 | Chen et al. | ................... | 370/360 |
| 7,224,670 B2 * | 5/2007 | Jeffries et al. | ................ | 370/231 |
| 7,237,007 B2 * | 6/2007 | Kamath et al. | ............... | 709/206 |
| 7,257,080 B2 * | 8/2007 | Martin | ....................... | 370/230 |
| 7,274,660 B2 * | 9/2007 | Hill et al. | .................... | 370/229 |
| 2002/0087720 A1 * | 7/2002 | Davis et al. | ................. | 709/238 |
| 2002/0150049 A1 * | 10/2002 | Collier et al. | ............... | 370/236 |
| 2003/0035373 A1 * | 2/2003 | Bass et al. | ................ | 370/230.1 |
| 2003/0103460 A1 * | 6/2003 | Kamath et al. | ........... | 370/236.2 |
| 2003/0107994 A1 * | 6/2003 | Jacobs et al. | ................. | 370/235 |
| 2003/0115355 A1 * | 6/2003 | Cometto et al. | ............. | 709/234 |
| 2004/0032827 A1 * | 2/2004 | Hill et al. | ..................... | 370/229 |
| 2004/0109411 A1 * | 6/2004 | Martin | ....................... | 370/229 |
| 2004/0120334 A1 * | 6/2004 | Nation | ........................ | 370/412 |

FOREIGN PATENT DOCUMENTS

| | | |
|---|---|---|
| EP | 1 061 698 A2 | 12/2000 |
| WO | WO 02/052800 | 7/2002 |

OTHER PUBLICATIONS

European Search Report dated May 28, 2004.

\* cited by examiner

*Primary Examiner*—Douglas B Blair

(57) ABSTRACT

In the method of flow control, a flow control message, requesting more data, is sent from a first communication device based on an amount of data output by the first communication device and an available data storage capacity of the first communication device.

9 Claims, 2 Drawing Sheets

METHOD FOR FLOW CONTROL IN A COMMUNICATION SYSTEM

BACKGROUND OF THE INVENTION

A communication system, particularly a wireless access network, contains various components and units to provide voice and data services over the air interface. As shown in FIG. 1, the wireless access network typically includes an access terminal 130, a communication transmission device such as a Base Station Transmission System ("BTS") 120, and a communication system control device such as a Base Station Controller ("BSC") 110. The BSC 110 receives data from the core network 100 and passes the data to the BTS 120 so that the BTS 120 can transmit the data to an access terminal ("AT") 130 over a wireless link 125. Data is communicated in the reverse direction as well and passed from the AT 130 to the core network 100. The connection between the BTS 120 and BSC 110 is usually considered as the backhaul portion of the network and is typically through a T1 facility 115.

Data frames transmitted from the BSC 110 to the BTS 120 are buffered at the BTS 120 before they are scheduled for transmission over the air interface. Usually the BTS 120 has a much more limited buffer size as compared to the buffers at the BSC 110. In addition, the air interface capacity and bandwidth for transmission is limited.

Because data frames at the BTS 120 are transmitted at a variable rate that most of the time is lower than the rate at the backhaul and because the packet arrival at the BSC 110 can be very high, the forward transmission path, from the BSC 110 to the BTS 120 and transmission to the air interface, presents a "funnel effect." If the flow from the BSC 110 to the BTS 120 is not controlled, the data frames may overflow the buffers (e.g., buffer 122) at the BTS 120 and cause large packet loss. Packet loss increases the probability of retransmission and thus decreases the system efficiency and quality of service. Therefore, flow control between the BSC 110 and BTS 120 attempts to minimize the buffer overflow probability and thus minimize packet loss and retransmissions. On the other hand, if the flow from the BSC 110 to BTS 120 is regulated too tightly, it may cause buffer underflow at the BTS 120 and thus waste the air interface capacity. Flow control between the BSC 110 and BTS 120 should be carefully managed to minimize both buffer overflow and buffer underflow so that the system resource can be fully utilized and system efficiency can be maintained.

Flow control refers to a mechanism or process that enables a data source to match its transmission rate to the currently available service rate at a receiver in a network. Flow control can also be considered a congestion control technique. Thus, flow control attempts to regulate the rate of data flow while not causing either an overflow or underflow in a network communication device.

One possible method of implementing flow control is to let the BTS 120 instruct the BSC 110 to send an amount of data that can be accommodated at the BTS 120. Specifically, the BTS 120 informs the BSC 110 by sending a flow control indication message indicating the amount of data that can be accommodated at the BTS 120. This receiver-driven flow control mechanism insures that buffer overflow will not occur. However, this method of flow control does not provide a mechanism to avoid buffer underflow at the BTS 120.

It will also be appreciated that the more flow control indication messages sent to the BSC 110, the more up-to-date information the BSC 110 will have for determining an amount of data to send to the BTS 120. However, flow control indication messages occupy bandwidth on the backhaul facility between the BSC 110 and BTS 120 and cause delay to other traffic transmitted on the backhaul. In addition, flow control messages consume processing power at both the BSC 110 and the BTS 120. Thus, the overhead created by sending flow control messages should be kept minimum.

SUMMARY OF THE INVENTION

The flow control method according to present invention regulates the flow of data from one communication device to another using a flow control message sent from a first communication device to a second communication device. The flow control message informs the second communication device on the amount of data the first communication device can accommodate. Based on the instruction and, typically, the amount of data it already sent to the first communication device, the second communication device determines the amount of data to send to the first communication device.

In one exemplary embodiment of the present invention, a flow control message is sent when a data output counter exceeds a dynamically established data output count threshold. The counter counts, for example, the number of data packets removed from a transmission buffer in the first communication device. Accordingly, the counter provides a measure of the amount of data that has been sent out since the last flow control message was sent.

According to the method of the present invention, the counter threshold is dynamically established based on the status (occupancy or availability) of the transmission buffer. In one exemplary embodiment, when the transmission buffer is relatively full, a lower count threshold is set. The low count threshold will cause flow control messages to be sent more frequently. Because the transmission buffer is relatively full, a flow control message will notify the second communication device that the first communication device can only accommodate a limited amount of data. The potential therefore exists for underflow—either because not enough data is sent over a period of time until the next flow control message and/or because a large amount of data is transmitted before the next flow control message. By increasing the frequency of sending the flow control messages, the method according to the present invention keeps the data flow coming without starving the transmission link at the first communication device. When the transmission buffer is relatively empty, a higher count threshold is set to reduce the frequency of sending flow control messages. Because the flow control message will indicate that the second communication device can send a relatively large amount of data, flow control messages do not need to be sent as frequently. In a communication system, this saves bandwidth on the transmission link between the two communication devices. Specifically to a wireless communication system, this saves bandwidth on the backhaul portion of the network. It also reduces the CPU processing power requirement on both devices.

BRIEF DESCRIPTION OF THE DRAWINGS

The present invention will become more fully understood from the detailed description given below and the accompanying drawings, wherein like elements are represented by like reference numerals, which are given by way of illustration only and thus are not a limit on the present invention and wherein.

DETAILED DESCRIPTION OF THE PREFERRED EMBODIMENTS

Figure 1:
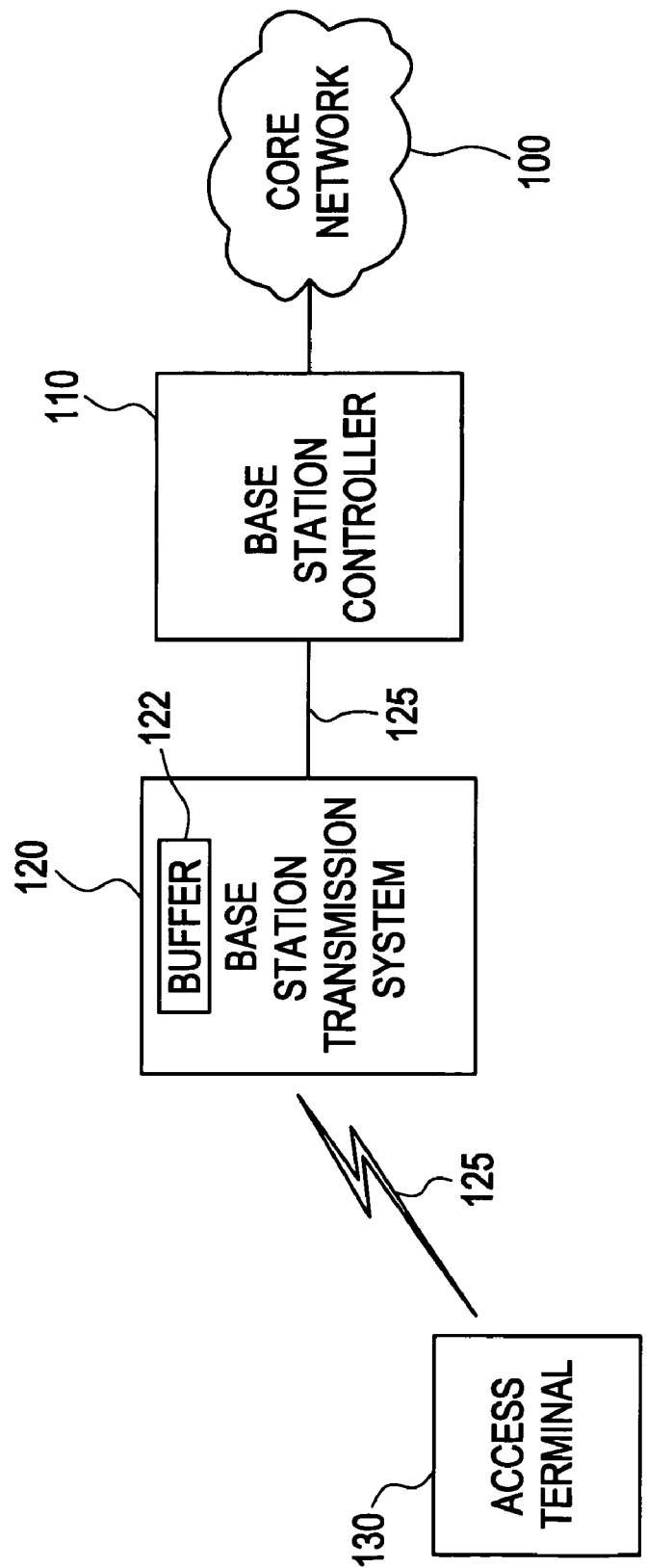
FIG. 1 is a block diagram illustrating a portion of a prior art wireless communication system.

The present invention provides a method of controlling the flow of data from one communication device to another in a network. For the purpose of explanation only, the method of the present invention will be described as applied to the wireless access network illustrated in FIG. 1, wherein the data communicated is communicated in packets. However, it will be readily understood that the invention is not limited to this implementation or form of data transmission.

In one exemplary embodiment, the flow control method according to present invention regulates the flow of packets from the BSC 110 to the BTS 120 using a flow control message sent from the BTS 120 to the BSC 110. The flow control message informs the BSC 110 of the number of packets that the BTS 120 can accommodate. Using this information and, typically, the number of packets it already sent to the BTS 120, the BSC 110 determines the additional number of packets to be sent to the BTS 120. In the embodiments of the present invention, a flow control message is sent when a packet counter exceeds a dynamically established packet count threshold. The packet counter counts the number of packets removed from the transmission buffer 122 and transmitted from the BTS 120 to ATs 130 since the last flow control message was sent. Accordingly, the packet counter provides a measure of the amount of data that has been transmitted since the last flow control message was sent. Namely, the counter provides the information on how fast the transmission buffer is drained and triggers the flow control messages to inform the BSC 110 about the storage space available at the BTS 120. As will be discussed in detail below with respect to FIG. 2, the BTS 120 dynamically establishes the packet count threshold based on the status (occupancy or availability) of the transmission buffer 122.

Figure 2:
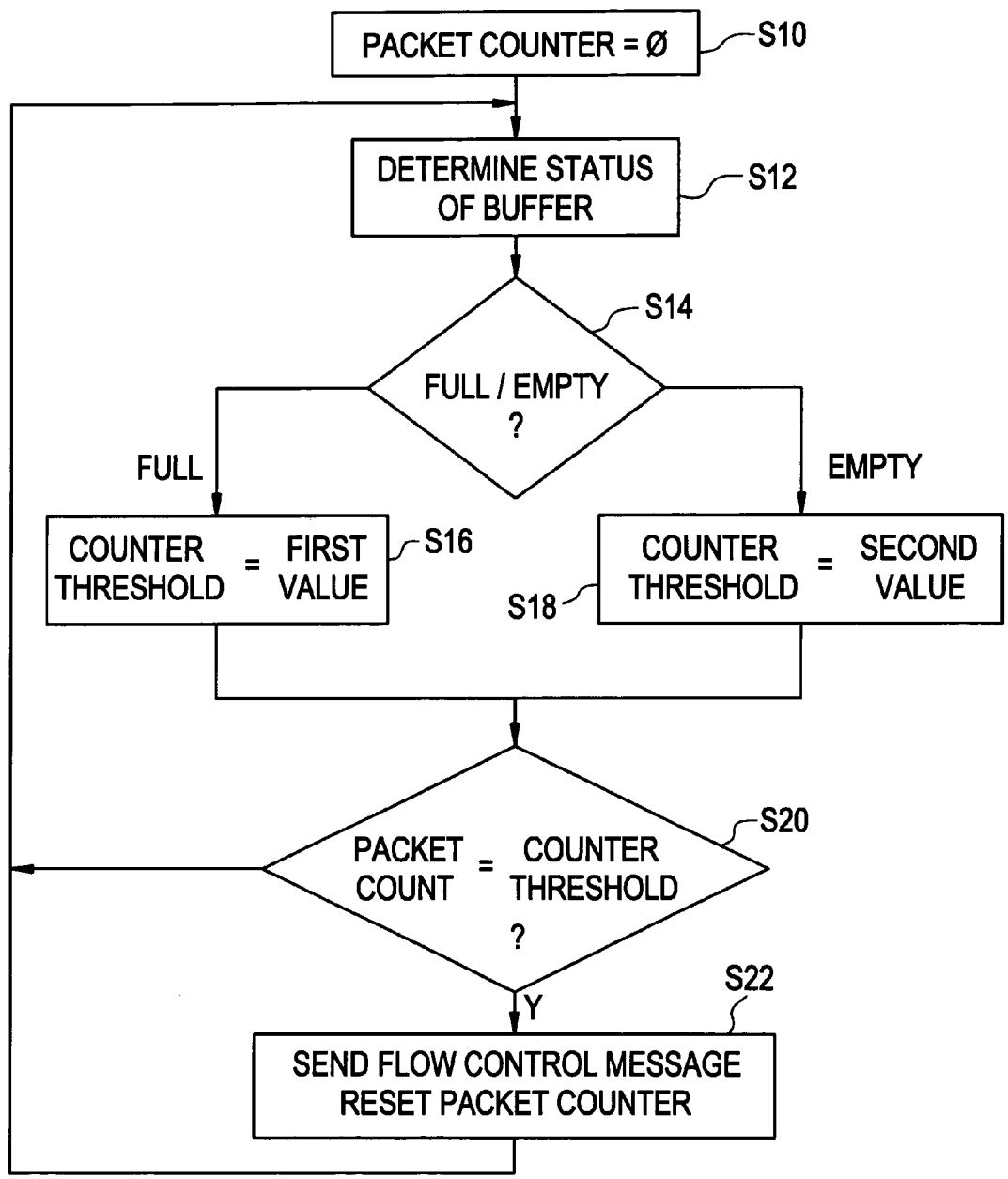
FIG. 2 is a flow diagram of a method of performing flow control according to the present invention.

As alluded to above, FIG. 2 illustrates one exemplary embodiment of the present invention in detail. As shown, in step S10, the BTS 120 initializes a packet counter to zero, then in step S12 the BTS 120 determines the status of the transmission buffer 122. The status of the transmission buffer 122 is the capacity of the transmission buffer 122 to store data packets. The status can be established in several ways. For example, according to one exemplary embodiment of the present invention, the status is established as the number additional data packets that could be stored in the transmission buffer 122. In another exemplary embodiment, the status or capacity is determined as the number of data packets currently stored in the transmission buffer 122. Given the fixed size of the transmission buffer 122, the number of data packets currently stored in the transmission buffer 122 directly reflects on the capacity of the transmission buffer 122 to store additional data packets.

Next, in step S14, the BTS 120 determines whether the status of the transmission buffer 122 indicates a relatively full or a relatively empty transmission buffer 122. For example, when the status is determined as the number of packets currently stored in the transmission buffer 122, step S14 involves comparing the determined number to a first capacity threshold. If the determined number is greater than the first capacity threshold, the transmission buffer 122 is determined to be relatively full. If the determined number is less than the first capacity threshold, the transmission buffer 122 is determined to be relatively empty.

When the status is determined as the number of additional data packets that could be stored in the transmission buffer 122, the status is compared to a second capacity threshold. If the determined number is less than the second capacity threshold, the transmission buffer 122 is determined to be relatively full, and if the determined number is greater than the second capacity threshold, the transmission buffer 122 is determined to be relatively empty.

If the BTS 120 determines the transmission buffer 122 is relatively full, then in step SI 6, the BTS 120 sets a packet counter threshold equal to a first value. However, if the BTS 120 determines the transmission buffer 122 is relatively empty, then in step S18, the BTS 120 sets the packet counter threshold equal to a second value, larger than the first value. Accordingly, as will be appreciated from the discussion below, setting the packet counter threshold to the first value will cause flow control messages to be sent more frequently than when the packet counter threshold is set to the second value. Both the first and second values as well as the capacity thresholds are design parameters set by the system operator and may be based on the size of the buffer, empirical study, etc.

During the process illustrated in FIG. 2, the BTS 120 increments the packet counter for each data packet removed from the transmission buffer 122 and successfully transmitted to an access terminal 130. After step S16 or step S18, the BTS 120 determines if this packet count is greater than or equal to the established packet counter threshold in step S20. If so, then in step S22 the BTS 120 sends a flow control message to the BSC 110, the packet counter is reset to zero and processing proceeds to step S12. However, if the packet count is less than the established packet counter threshold, then processing proceeds to step S12.

By dynamically establishing the packet counter threshold, the method according to the present invention assists in preventing under flow at the transmission buffer 122. When the transmission buffer 122 is relatively full, a flow control message will notify the second communication device that the BTS 120 can only accommodate a limited amount of data. The potential therefore exists for underflow—either because not enough data is sent over a period of time until the next flow control message and/or because a large amount of data is transmitted before the next flow control message. By increasing the frequency of sending the flow control messages when the transmission buffer is relatively full, the method according to the present invention keeps the data flow coming without starving the transmission link at the BTS 120. Conversely, when the transmission buffer 122 is relatively empty, a higher count threshold is set to reduce the frequency of sending flow control messages. Because the flow control message will indicate that the second communication device can send a relatively large amount of data, flow control messages do not need to be sent as frequently. This saves bandwidth on the backhaul portion of the network. It also reduces the CPU processing requirement at both communication devices.

As will be appreciated, the method of present invention is not limited to establishing only two statuses for the transmission buffer. Instead, any number of statuses can be established, with each status having a corresponding packet counter threshold value. By providing a greater number of statuses and corresponding packet counter threshold values, the sending of flow control messages more precisely matches the capacity of the transmission buffer 122 to handle additional data packets.

Figure 3:
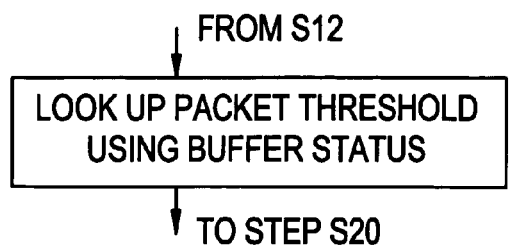
FIG. 3 illustrates an alternative to the embodiment of FIG. 2.

In one exemplary embodiment of the present invention, steps S14-S18 of the method illustrated in FIG. 2 are replaced with step S20 illustrated in FIG. 3. In this alternative embodiment, the BTS 120 has a look up table storing packet counter thresholds indexed by buffer status. Accordingly, in step S20, the BTS 120 accesses a packet counter threshold from the look up table using the status determined in step S12.

While the present invention has been described as applied to a BTS 120 in sending flow control messages to a BSC 110, it will be appreciated from the forgoing disclosure that the method according to the present invention is not limited to this application. Instead, the present invention finds application in controlling data flow between any two communication devices.

The invention being thus described, it will be obvious that the same may be varied in many ways. Such variations are not to be regarded as a departure from the spirit and scope of the invention, and all such modifications as would be obvious to one skilled in the art are intended to be included within the scope of the present invention.

What is claimed is:

1. A method of flow control between communication devices, comprising:
   sending flow control messages from a first communication device to a second communication device at a variable rate, the flow control messages indicating the first communication device can accept more data from the second communication device,
   the variable rate for sending flow control messages being determined based on a comparison between a measure of data outputted from an output buffer of the first communication device since a previous flow control message was sent and a dynamically adapted threshold level,
   the dynamically adapted threshold level being established as a function of data fill in the first communication device output buffer.

2. The method of claim 1, wherein the threshold amount of data is based on the available data storage capacity such that the greater the available data storage capacity, the higher the threshold amount of data.

3. The method of claim 2, wherein the amount of data output is the amount of data output since a last flow control message was sent.

4. The method of claim 2, wherein the threshold is accessed from a look up table using the available storage capacity as an index.

5. The method of claim 1, further comprising:
   determining the available data capacity based on an amount of unused data storage in the first communication device.

6. The method of claim 1, further comprising:
   determining the available data capacity based on the amount of data stored at the first communication device.

7. The method of claim 1, wherein the amount of data output is the amount of data output since a last flow control message was sent.

8. A method of flow control between communication devices, comprising:
   determining a number of data packets stored in a data buffer of a first communication device;
   setting a dynamic transmission threshold as a function of data fill in the first communication device data buffer;
   counting a number of packets transmitted by the first communication device since a last transmission of a flow control message;
   comparing the number of transmitted packets to a present value of the dynamic transmission threshold; and
   sending a flow control message from the first communication device to a second communication device at a variable rate, if the number of transmitted packets is equal to or greater than the dynamic threshold value, the flow control message indicating the first communication device can accept more data from the second communication device when a count generated by the counting step equals the transmission threshold.

9. A method of flow control between communication devices comprising:
   determining a status of a data storage buffer at a first communication device, the status indicating whether the data storage buffer is approaching underflow or approaching overflow;
   establishing a dynamically adapted send threshold value based on the determined status; and
   sending a flow control message from the first communication device to a second communication device at a variable rate, if the dynamic threshold value is equal to or greater than an underflow threshold value and less than or equal to an overflow threshold value, indicating the first communication device can accept more data from the second communication device based on the send threshold and an amount of data output by the first communication device since a last flow control message was sent.

* * * * *

UNITED STATES PATENT AND TRADEMARK OFFICE
CERTIFICATE OF CORRECTION

PATENT NO. : 7,603,475 B2  Page 1 of 1
APPLICATION NO. : 10/401671
DATED : October 13, 2009
INVENTOR(S) : Yang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 975 days.

Signed and Sealed this

Fifth Day of October, 2010

David J. Kappos
*Director of the United States Patent and Trademark Office*